US008621145B1

(12) United States Patent  
Kimmel et al.

(10) Patent No.: US 8,621,145 B1  
(45) Date of Patent: Dec. 31, 2013

(54) CONCURRENT CONTENT MANAGEMENT AND WEAR OPTIMIZATION FOR A NON-VOLATILE SOLID-STATE CACHE

(75) Inventors: Jeffrey S. Kimmel, Chapel Hill, NC (US); Randy Pafford, Sunnyvale, CA (US); Rajesh Sundaram, Mountain View, CA (US)

(73) Assignee: NetApp, Inc., Sunnyvale, CA (US)

(*) Notice: Subject to any disclaimer, the term of this patent is extended or adjusted under 35 U.S.C. 154(b) by 450 days.

(21) Appl. No.: 12/697,129

(22) Filed: Jan. 29, 2010

(51) Int. Cl.  
*G06F 12/00* (2006.01)

(52) U.S. Cl.  
USPC ............ 711/113; 711/103; 711/E12.009; 711/E12.019

(58) Field of Classification Search  
USPC ............ 711/113, E12.019, E12.009, 103  
See application file for complete search history.

(56) References Cited

U.S. PATENT DOCUMENTS

| | | | | |
|---|---|---|---|---|
| 5,548,724 A * | 8/1996 | Akizawa et al. | | 709/203 |
| 5,680,579 A * | 10/1997 | Young et al. | | 711/157 |
| 6,289,471 B1 | 9/2001 | Gordon | | |
| 6,772,199 B1 * | 8/2004 | Keller et al. | | 709/213 |
| 2005/0114589 A1 | 5/2005 | Lofgren et al. | | |
| 2006/0004957 A1 * | 1/2006 | Hand et al. | | 711/113 |
| 2007/0083724 A1 | 4/2007 | Kitamura | | |
| 2007/0198796 A1 * | 8/2007 | Warren, Jr. | | 711/165 |
| 2007/0208904 A1 * | 9/2007 | Hsieh et al. | | 711/103 |
| 2007/0260811 A1 | 11/2007 | Merry et al. | | |
| 2007/0294490 A1 | 12/2007 | Freitas et al. | | |
| 2008/0140918 A1 | 6/2008 | Sutardja | | |
| 2008/0216800 A1 | 9/2008 | Brusoe et al. | | |
| 2008/0228997 A1 | 9/2008 | Farhan et al. | | |

OTHER PUBLICATIONS

Chiang et al. Using Data to Improve Cleaning Performance for Flash Memory. Mar. 3, 1999 [online], [retrieved on May 7, 2012]. Retrieved from the Internet <URL:http://citeseerx.ist.psu.edu/viewdoc/download;jsessionid=A65B502AA147CBACE355E491A957CCEA?doi=10.1.1.26.7926&rep=rep1&type=pdf>.*

Non-Final Office Action Mailed May 12, 2011 in Co-Pending U.S. Appl. No. 12/058,476, filed Mar. 28, 2008.

Non-Final Office Action mailed Oct. 28, 2010 in Co-Pending U.S. Appl. No. 12/058,476, filed Mar. 28, 2008.

EMC Data Sheet, "EMC Symmetrix DMX Series, The World's Most Trusted Storage Platform", 8 pages (2008).

Co-Pending U.S. Appl. No. 12/058,476, filed Mar. 28, 2008.

David Donatelli, "EMC Symmetrix DMX Series", Webcast David Donatelli Discusses EMC's Lastest Storage Innovation. pp. 1-9, (publication date unknown).

Ellard, et al., "DISP: Practical, Efficient, Secure and Fault-Tolerant Distrubted Data Storage", ACM Transactions on Storage, vol. 1, No. 1, pp. 71-94, Dec. 2004.

(Continued)

*Primary Examiner* — Larry MacKall  
(74) *Attorney, Agent, or Firm* — Perkins Coie LLP (57) ABSTRACT

Described is a technique for managing the content of a non-volatile solid-state memory data cache to improve cache performance while at the same time, and in a complementary manner, providing for automatic wear leveling. A modified circular first-in first-out (FIFO) log/algorithm is generally used to determine cache content replacement. The algorithm is used as the default mechanism for determining cache content to be replaced when the cache is full but is subject to modification in some instances. In particular, data are categorized according to different data classes prior to being written to the cache, based on usage. Once cached, data belonging to certain classes are treated differently than the circular FIFO replacement algorithm would dictate. Further, data belonging to each class are localized to designated regions within the cache.

18 Claims, 7 Drawing Sheets

(56) References Cited

OTHER PUBLICATIONS

EMC Press Release, "EMC²® Where Information Lives®,"EMC in Major Storage Performance Breakthrough; First with Enterprise-Ready Solid State Flash Drive Technology, pp. 1-3, Jan. 14, 2008.

Gal, et al., "Algorithms and Data Structures for Flash Memories", ACM Computing Surveys, vol. 37, No. 2, pp. 138-163, Jun. 2005.

Adam Leventhal, "Flash Storage Memory", Communications of the ACM, vol. 51, No. 7, pp. 47-51, Jul. 2008.

NetApp Accelerates Costs Savings, Boosts Performance with Solid-State Technologies, NetApp—Company-News@NetApp, pp. 1-3, Feb. 3, 2009.

NetApp Boost Performance Acceleration Module, "Boost Performance Without Adding Disk Drives", http://www.netapp.com/us/communities/tech-ontap/pam.html; pp. 1-4, Sep. 2008.

NetApp-Storage Nuts & Bolts: Performance Acceleration Module, http://blog.netapp.com/storage_nuts_n_bolts/2008/08performance, pp. 1-3, Aug. 21, 2008.

"Page Replacement Algorithm", Wikipedia, the Free Encyclopedia; http://en.wikipedia.org/wiki/Page_replacement_algorithm , pp. 1-9, Dec. 15, 2009.

Rabin, et al., "Verifiable Secret Sharing and Multiparty Protocols with Honest Majority", ACM ISBN:0-89791-307-8, pp. 73-85, May 14-17, 1989.

"ReadyBoost", Wikipedia, the free encyclopedia; http://en.wikipedia.org/wiki/Readyboost Dec. 15, 2009; pp. 1-5.

Sun Microsystems; "Solaris™ ZFS™ Enables Hybrid Storage Pools—Shatters Economic and Performance Barriers": Nov. 2008; pp. 1-4.

Wood, et al, "Flash Memory Technology in Enterprise Storage Flexible Choices to Optimize Performance" NetApp White Paper; Nov. 2008; pp. 1-10.

Advisory Action mailed Apr. 11, 2012 in Co-Pending U.S. Appl. No. 12/058,476 of Ellard D.J., et al., filed Mar. 28, 2008.

Final Office Action mailed Jan. 6, 2012 in Co-Pending U.S. Appl. No. 12/058,476 of Ellard, D.J., et al., filed Mar. 28, 2008.

Non-Final Office Action mailed Aug. 31, 2012 in Co-Pending U.S. Appl. No. 12/058,476 of Ellard, D.J., et al., filed Mar. 28, 2008.

* cited by examiner

CONCURRENT CONTENT MANAGEMENT AND WEAR OPTIMIZATION FOR A NON-VOLATILE SOLID-STATE CACHE

FIELD OF THE INVENTION

At least one embodiment of the present invention pertains to data storage systems, and more particularly, to a technique for concurrent content management and wear optimization for a non-volatile solid-state cache.

BACKGROUND

Network based storage (or simply, "network storage") is a common approach for backing up data, making large amounts of data accessible to multiple users, and other purposes. A storage server is a type of storage controller used in a network storage environment to make data available to client (host) systems, by presenting or exporting to the clients one or more logical containers of data. There are various forms of network storage, including network attached storage (NAS) and storage area network (SAN). In a NAS context, a storage server services file-level requests from clients, whereas in a SAN context a storage server services block-level requests. Some storage servers are capable of servicing both file-level requests and block-level requests.

In conventional network storage systems, a storage server maintains data in a main (persistent) storage subsystem, which may be organized into one or more groups of storage devices such as hard disk drives (HDDs). A storage server also typically uses its internal memory as a cache, sometimes called a "buffer cache", to reduce latency in servicing read and write requests from a client's perspective. In conventional storage servers, the buffer cache is commonly implemented as dynamic random access memory (DRAM). Various cache content management techniques are also known in the art for improving "hit rate" and/or space utilization of a cache, to improve overall performance of the system.

While significant advances have been made in terms of reducing access latency in storage servers, larger and increasingly complex workloads experienced by today's storage servers demand continued improvement in this regard. In this regard, a more recent development in the art is to employ a secondary cache, or "victim cache", that operates logically between the internal buffer cache (the primary cache) and the main storage subsystem. Data that are evicted from the internal buffer cache are generally stored in the victim cache whenever practical. A victim cache generally is larger and slower (in terms of access latency) than the internal buffer cache but smaller and faster than the main storage subsystem. In at least one known server system, the victim cache, like the internal buffer cache, is implemented in DRAM.

One problem with DRAM, however, is that it is relatively expensive. Flash memory is a potential alternative to DRAM for use as a victim cache. Flash memory is generally much less expensive than DRAM per unit storage, yet like DRAM, it has much faster random read access speed than conventional disk drives. Further, flash memory is not volatile like DRAM.

However, flash memory has certain characteristics that can interfere with conventional cache content management techniques for improving cache performance. Firstly, flash memory wears out after a finite number of program-erase cycles. Failure of a memory component that is being used to store critical software or data can be disastrous. Therefore, some flash memory devices employ a technique called wear leveling to spread the wear more evenly across an entire flash device, so that no particular portion of the device experiences substantially more wear (and therefore earlier failure) than any other portion. However, because wear leveling techniques place restrictions upon where data can be stored at any given point in time, these techniques can undermine or hinder cache content management techniques that are designed to improve cache performance.

Also, flash memory has "erase blocks", where an erase block is the smallest unit of flash memory that can be erased at a time. Erase blocks are substantially larger than the smallest unit of memory that can be programmed. For example, NAND flash memory can be read or programmed in a random access fashion in units typically sized in the range of 2 KB to 4 KB, however, an erase block may be on the order of 256 KB. Furthermore, in order to rewrite any given byte in flash memory, the entire erase block that contains the byte must first be erased. Finally, to maximize data integrity in today's NAND flash memories, pages within an erase block need to be programmed in sequential order. These characteristics can further hinder cache content management techniques.

SUMMARY

The technique introduced here includes a method for making write allocation decisions for a nonvolatile solid-state memory (e.g., flash) data cache, by executing a cache replacement algorithm that concurrently applies cache hit optimization and wear optimization for the cache. In this context, cache hit optimization can include achieving good cache hit rates and/or achieving cache utilization, and wear optimization can include achieving good wear rates and/or achieving good wear leveling. Thus, the technique can include managing the content of the cache to improve cache performance while at the same time, and in a complementary manner, providing for automatic wear optimization of the cache.

To accomplish this in one embodiment, a modified circular first-in first-out (FIFO) log/algorithm is used to determine cache content replacement. The circular FIFO log is used as the normal mechanism for determining cache content to be replaced when the cache is full. However, this mechanism is subject to modification in some instances. Specifically, data to be stored in the cache are categorized into various different data classes, prior to being stored in the cache, based for example on data usage, e.g., the expected frequency of usage (e.g., reading or rewriting) of the data, workload and/or other criteria. Once stored in the cache, data belonging to certain classes are treated differently than simply evicting them according to the FIFO algorithm. For example, data which are expected to remain valid for an extended period may be exempted from the FIFO algorithm entirely for multiple FIFO cycles.

Further, data belonging to any particular class are localized to designated regions within the cache, such as designated erase blocks or erase block stripes. It is advantageous to group data subject to frequent rewrite or deletion, for example, so that associated invalidations in the cache are concentrated within a smaller number of erase blocks. To provide wear leveling, erase blocks designated for such data can be selected randomly and rotated with other data classes.

Other aspects of the technique will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

References in this specification to "an embodiment", "one embodiment", or the like, mean that the particular feature, structure or characteristic being described is included in at least one embodiment of the present invention. Occurrences of such phrases in this specification do not necessarily all refer to the same embodiment. On the other hand, different embodiments may not be mutually exclusive either.

Overview

As described further below, a network storage server can include a primary cache (e.g., buffer cache) and a solid-state secondary cache (e.g., victim cache), in addition to a main storage subsystem, where the secondary cache can be implemented as flash memory. The technique introduced here manages the content of the secondary cache to improve cache performance while at the same time, and in a complementary manner, providing for automatic wear leveling of the secondary cache. Note that while the secondary cache is described here as being implemented in flash memory as a particularly useful embodiment, it can also be applied advantageously to a cache made from another type or types of storage device. Furthermore, the technique introduced here can be applied advantageously to a cache which is not a secondary or victim cache, and it can be applied advantageously in a system other than a storage server.

In one embodiment, data to be stored in the secondary cache are first classified into various different data classes, prior to being stored in the secondary cache. These classifications are used to modify the default search circular FIFO replacement algorithm for certain data and also to group together data with similar cache aging and invalidation behaviors within erase block boundaries in the secondary cache. Any given erase block in the secondary cache will be allowed to store data from only one of these data classes at a time. In an embodiment where the secondary cache includes multiple banks of memory chips, the circular FIFO replacement algorithm and the modifications/exceptions to it described herein may be applied separately to each bank, rather than to the secondary cache as a whole.

In one embodiment, the data classes include "slow-turn" data, "fast-turn" data, and "no-turn" data. These designations of data are not predetermined or static, but rather are determined dynamically as needed during each cycle of the circular FIFO log. Slow-turn data includes cache lines that are expected to remain valid for a full cycle of the circular FIFO log (circular queue) and which should be subject to replacement in the cache upon expiration of a complete cycle of the circular FIFO log if they are not recently used. A cache line can be, for example, a few KB in length (e.g., 4 KB) and, in one embodiment, is the same size as the smallest uniquely addressable unit of data that the storage server manages, hereinafter called a "data block". Note that a "data block" is not to be confused with a cache "erase block", which is a unit of memory space rather than a unit of data. Slow-turn data are placed into erase blocks or erase stripes designated to hold only slow-turn data. An "erase stripe" is a set of erase blocks striped across a bank of flash storage and may be used as a RAID parity stripe. A "bank" is a row of memory chips on a card. For example, an erase stripe may be formed of several (e.g., eight) erase blocks that each hold actual user data, plus at least one erase block that holds parity data for the data in the erase blocks in that stripe.

Fast-turn data includes cache lines that are determined to be likely to be subject to overwrite or deletion long before a full cycle of the FIFO queue completes (what exactly "long before" means can be a policy-based decision, which may be implementation-specific). Fast-turn data are placed into erase blocks or erase stripes designated for fast-turn data only. The rationale for designating fast-turn data in advance (i.e., prior to storage in the secondary cache) is that individual cache lines (of a few KB in size) are much smaller than erase blocks, whereas flash memory reallocation/rewrite today must be done at erase block granularity (typically 256 KB to a few MB). Thus, it is advantageous to group cache lines subject to frequent rewrite or deletion together, so that associated invalidations in the flash cache will be concentrated within a relatively small population of erase blocks.

When a policy-specified fraction of a fast-turn erase block or erase stripe has been invalidated (e.g., by logical overwrites or deletions), and the position of that erase block or stripe is at least a minimum (e.g., policy-specified) interval from FIFO-driven replacement, then that erase block or stripe will be made available for reuse by new cache fill activity immediately, rather than waiting for reuse under the FIFO algorithm. In other embodiments the latter criterion may be omitted, i.e., a fast-turn erase block or stripe can be made available for reuse regardless of how far it is from FIFO-driven replacement, e.g., based entirely or primarily on how full it is with invalidated data. In one embodiment, reuse of a fast-turn erase block or stripe is restricted to slow-turn data, so that each erase block is erased at most twice per FIFO cycle. Physical erase blocks or stripes used for fast-turn data can be selected randomly, as it is expected that the extra wear associated with fast-turn reuse will be evenly distributed across the flash memory array over the life of the flash hardware. Alternatively, simple tracking methods can be used to more positively assure even reuse under fast-turn methods.

In one embodiment, for cache lines that are about to be replaced, if they have been recently used (as defined by policy, which may vary by implementation), the cache lines are copied to a new location in the cache (this is called "cache line rewrite") before they are replaced, thus placing them at the "back end" of the circular FIFO log, (the point farthest from the FIFO-driven erase point of the log) where they will not be subject to replacement until the next full cycle of the FIFO algorithm. The copy operation may be internal to the secondary cache hardware/firmware or it may involve a new write from the buffer cache to the secondary cache.

No-turn data includes cache lines which are expected to remain valid across multiple cycles of the FIFO algorithm (the specific number of cycles can be policy-driven and can be implementation-specific). It is desirable to maintain such data in the secondary cache without having to perform rewrites of those data on each FIFO cycle, in order to reduce management overhead and flash memory wear. Thus, cache lines which exhibit such behavior can be grouped into designated no-turn erase blocks or erase stripes, which are not subject to erasure for at least several cycles of the FIFO algorithm. An erase block's or stripe's temporary exemption from reuse can be cancelled if a sufficient (policy-defined) fraction of the erase block or stripe has been invalidated (e.g., by logical overwrites or deletions). Well-known mechanisms for tracking cache line invalidation can be employed for all of slow-turn, fast-turn, and no-turn erase blocks.

Thus, the technique introduced here employs classification and localization of cache lines with similar cache aging and invalidation behaviors within erase block boundaries, allowing efficient reuse of flash locations while improving effective cache capacity. After erase block fill using these methods, the slow-turn, fast-turn or no-turn designation for an erase block or stripe can be forgotten, using line-granular tracking of line use and invalidation to inform subsequent reuse of the erase block or stripe. Alternatively, the slow-turn, fast-turn or no-turn designation can be retained and inform subsequent replacement policy.

In one embodiment, the secondary cache is a read cache, where all cache content is a duplicate of identical content in the main storage subsystem (e.g., on disk). This approach works well as long as the main storage subsystem can perform writes efficiently, and thus needs the cache primarily to reduce the overhead of random read accesses. The technique can also be employed in conjunction with a read/write (or writeback) cache in order to also reduce write activity on the main storage subsystem.

A set associative cache tag store can be employed to limit the overhead associated with cache lookup and tag management. Alternatively, other cache tag organizations could be used in conjunction with this technique, including fully associative tags, e.g., as would be desirable to allow arbitrary data placement in combination with writeback caching.

One embodiment employs a hardware structure that places physical NAND flash memory under the control of software and/or firmware, which controls both cache content and mappings of that content onto the physical memory. However, the technique introduced here could also be used in combination with memory hardware which implements wear leveling firmware and/or software within a logical-to-physical mapping layer, e.g. within a solid-state drive (SSD). Even above such a mapping layer, the technique introduced here can improve wear, write performance, and/or effective capacity of the cache while maintaining high cache hit rates.

Thus, the technique introduced here employs cache management which is sensitive to idiosyncrasies of flash memory hardware, providing for a better combination of cache capacity, hit rate, memory wear, and management overhead. These benefits can even be realized if the cache is implemented using SSDs or other flash devices/subsystems with their own internal mapping layers.

Environment

Figure 1:
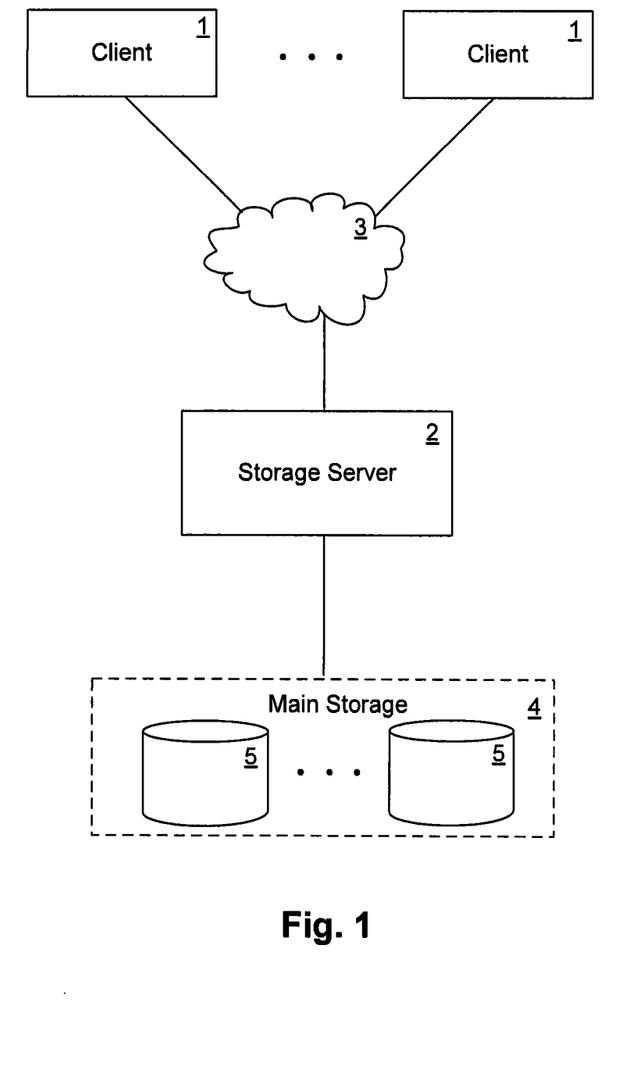
FIG. 1 illustrates a network storage environment.

FIG. 1 illustrates an environment in which the technique introduced here can be employed. In FIG. 1, a network storage server 2 is coupled to a main storage subsystem 4 and is also coupled to a set of clients 1 through an interconnect 3. The interconnect 3 may be, for example, a local area network (LAN), wide area network (WAN), metropolitan area network (MAN), global area network such as the Internet, a Fibre Channel fabric, or any combination of such interconnects. Each of the clients 1 may be, for example, a conventional personal computer (PC), server-class computer, workstation, handheld computing/communication device, or the like.

Storage of data in the main storage subsystem 4 is managed by the storage server 2. The storage server 2 receives and responds to various read and write requests from the clients 1, directed to data stored in or to be stored in the main storage subsystem 4. The main storage subsystem 4 includes a number of nonvolatile mass storage devices 5, which can be, for example, conventional magnetic or optical disks or tape drives; alternatively, they can be non-volatile solid-state memory, such as flash memory, or any combination of such devices. It is assumed that the mass storage devices 5 in the main storage subsystem 4 are organized into one or more RAID groups, and the storage server 2 accesses the main storage subsystem 4 using a RAID algorithm for redundancy (e.g., RAID-1, RAID-4, RAID-5 or RAID-6).

The storage server 2 may provide file-level data access services to clients 1, such as commonly done in a NAS environment, or block-level data access services such as commonly done in a SAN environment, or it may be capable of providing both file-level and block-level data access services to clients 1. Further, although the storage server 2 is illustrated as a single unit in FIG. 1, it can have a distributed architecture. For example, the storage server 2 can be designed as a physically separate network module (e.g., "N-blade") and disk module (e.g., "D-blade") (not shown), which communicate with each other over a physical interconnect. Such an architecture allows convenient scaling, such as by deploying two or more N-modules and D-modules, all capable of communicating with each other through the interconnect.

Architecture

Figure 2:
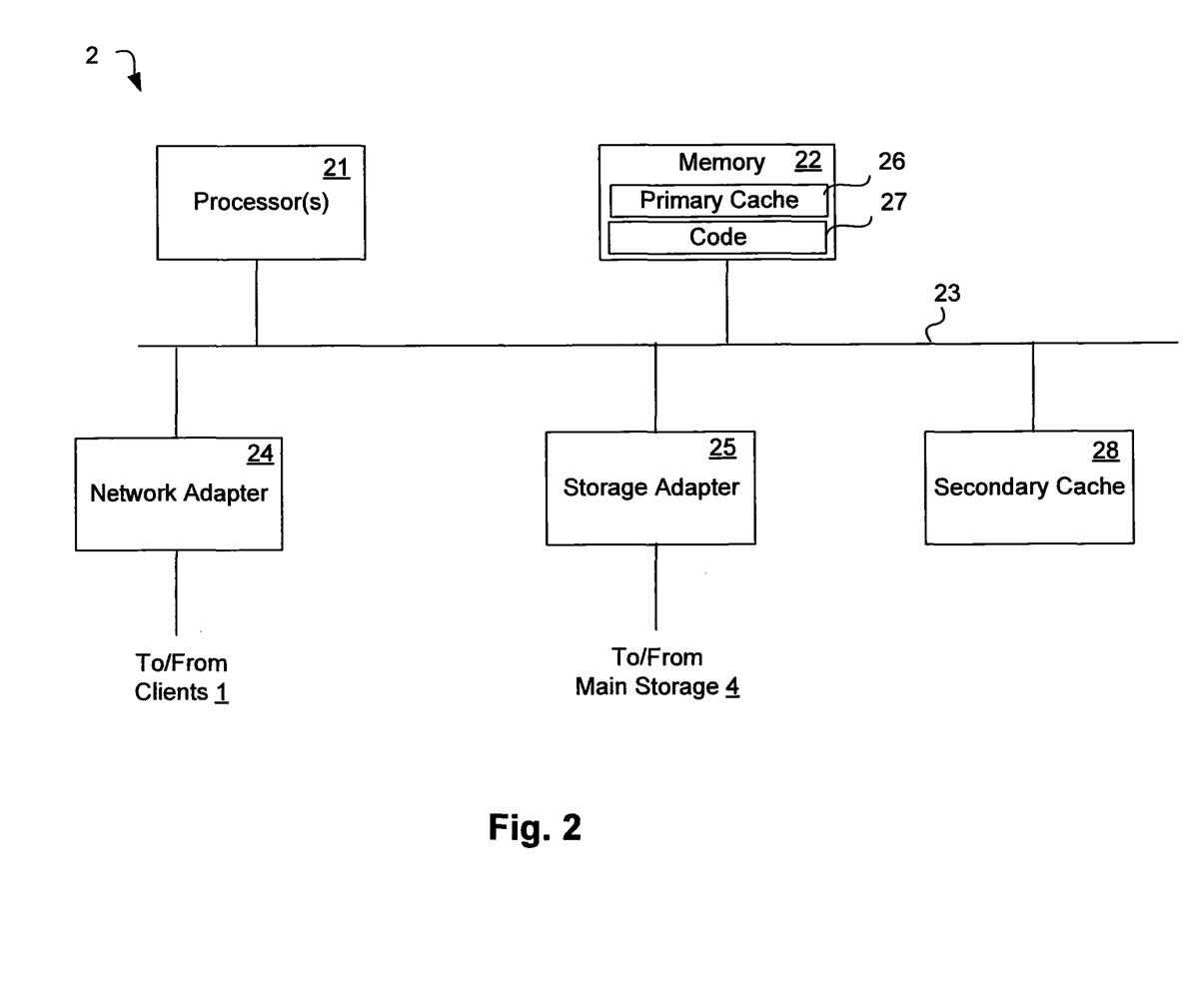
FIG. 2 is a high-level block diagram of the architecture of the storage server.

FIG. 2 is a high-level block diagram showing an example of the architecture of the hardware of a network storage server in which the techniques described above can be implemented (e.g., storage server 2 in FIG. 1). In the illustrated embodiment, the storage server 2 includes one or more processors 21 and memory 22 coupled to an interconnect 29. The interconnect 23 shown in FIG. 2 is an abstraction that represents any one or more separate physical buses, point-to-point connections, or both, connected by appropriate bridges, adapters, or controllers. The interconnect 23, therefore, may include, for example, a system bus, a Peripheral Component Interconnect (PCI) bus or PCI-Express fabric, a HyperTransport fabric or industry standard architecture (ISA) bus, a small computer system interface (SCSI) bus, a Serial Attached SCSI (SAS) fabric, a Fibre Channel (FC) fabric, a Serial ATA bus (SATA), a universal serial bus (USB), IIC (I2C) bus, or an Institute of Electrical and Electronics Engineers (IEEE) standard 1394 bus, also called "Firewire".

The processor(s) 21 is/are the central processing unit (CPU) of the storage server 2 and, thus, control the overall operation of the storage server 2. In certain embodiments, the processor(s) 21 accomplish this by executing software or firmware stored in memory 22. The processor(s) 21 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 22 is or includes the main memory of the storage server 2. This memory can implement the primary cache 26, or buffer cache, of the storage server 2. The memory 22 represents any form of random access memory (RAM), read-only memory (ROM), flash memory, or the like, or a combination of such devices. In operation, the memory 22 may also contain, among other things, code 27 that represents the functionality of the storage operating system (discussed below).

The storage server 2 also includes a secondary cache 28, which may be used as a victim cache for data evicted from the primary cache 26. The secondary cache 28 can be implemented as flash memory, for example.

Also connected to the processor(s) 21 through the interconnect 23 are a network adapter 24 and a storage adapter 25. The network adapter 24 provides the storage server 2 with the ability to communicate with remote devices, such as hosts 1, over the interconnect 23 and may be, for example, an Ethernet adapter or Fibre Channel adapter. The storage adapter 25 allows the storage server 2 to access the PPS subsystem 4 and may be, for example, a Fibre Channel adapter or SCSI adapter.

Figure 3:
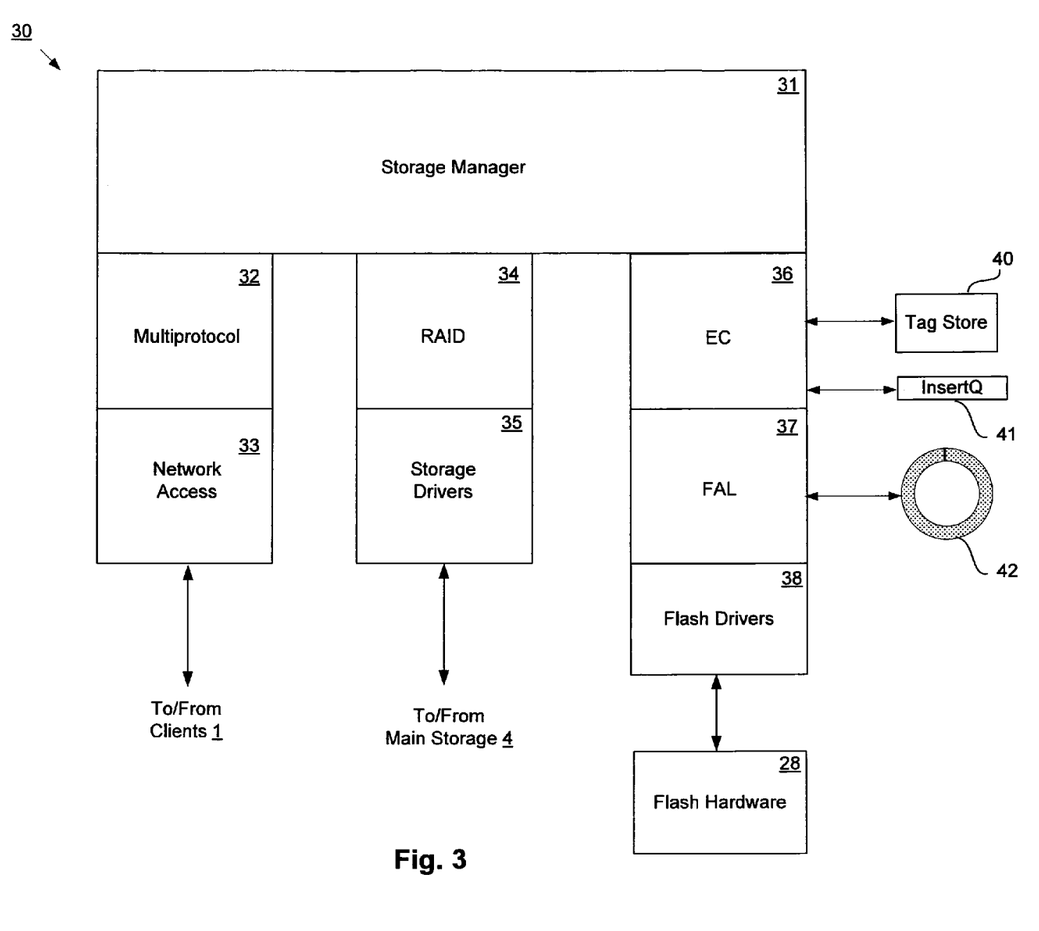
FIG. 3 is a block diagram of the architecture of a storage operating system of a storage server.

The storage server 2 includes a storage operating system for use in controlling its basic operations (e.g., reading and writing data in response to client requests). The storage operating system can be implemented as programmable circuitry programmed/configured with software and/or firmware, or as specially designed (hardwired) circuitry, or as a combination of such forms. FIG. 3 schematically illustrates an example of the architecture of the storage operating system.

In illustrated embodiment, the storage operating system 30 includes several modules, or "layers". These layers include a storage manager 31, which is the core functional element of the storage operating system 30. The storage manager 31 imposes a structure (e.g., a hierarchy) on the data stored in the main storage subsystem 4 and services read and write requests from clients 1. To improve performance, the storage manager 31 may accumulate batches of writes in the primary cache 26 and then stream them to the main storage subsystem 4 as large, sequential writes.

In one embodiment, the smallest uniquely addressable unit of data that the storage manager 31 manages is a 4 KB block, called a "data block" herein. Note that the term "file system" here is used only for convenience and does not imply that data must be stored in terms of files per se.

To allow the storage server 2 to communicate over the network 3 (e.g., with clients 1), the storage operating system 30 also includes a multiprotocol layer 32 and a network access layer 33, logically "under" the storage manager 31. The multiprotocol 32 layer implements various higher-level network protocols, such as Network File System (NFS), Common Internet File System (CIFS), Hypertext Transfer Protocol (HTTP), Internet small computer system interface (iSCSI), and/or backup/mirroring protocols. The network access layer 33 includes one or more network drivers that implement one or more lower-level protocols to communicate over the network, such as Ethernet, Internet Protocol (IP), Transport Control Protocol/Internet Protocol (TCP/IP), Fibre Channel Protocol (FCP) and/or User Datagram Protocol/Internet Protocol (UDP/IP).

Also, to allow the storage server 2 to communicate with the main storage subsystem 4, the storage operating system 30 includes a storage access layer 34 and an associated storage driver layer 35 logically under the storage manager 31. The storage access layer 34 implements a higher-level disk storage redundancy algorithm, such as RAID-1, RAID-4, RAID-5 or RAID-6 and, therefore, is henceforth referred to as "RAID layer 34" to facilitate description. The storage driver layer 35 implements a lower-level storage device access protocol, such as Fibre Channel Protocol (FCP) or small computer system interface (SCSI).

Additionally, to allow the storage server 2 to communicate with the secondary cache 28, the storage operating system 30 includes an external cache (EC) layer 36, a flash adaptation layer (FAL) 37 and a flash driver layer 38, all logically under the storage manager 31. The EC layer 36 directs accesses to the secondary cache 28, tracks and controls contents of the secondary cache 28, and manages interaction of the storage manager 31 with the secondary cache 28, including control flow, buffer resources and shared state. In particular, the EC layer 36 determines which data gets acted upon in relation to reading from or writing to the secondary cache 28 and when such data gets acted upon. In one embodiment the EC layer 36 monitors and tracks historical data usage patterns and, based on those patterns, determines which data is classified as slow-turn, fast-turn and no-turn. In this regard, a historical data usage pattern might be considered to represent or indicate an expected future usage pattern. Data may also be classified into these categories according to different workload definitions associated with the data and/or according to the application(s) that access the data. For purposes of this description, all of these possible criteria are considered to fall within the meanings of the terms "data usage" and "expected usage".

Note that the term "external" in external cache layer 36 does not imply that the secondary cache 28 must be in a separate physical platform or enclosure as the other components of the storage server 2 (though neither does it exclude that possibility). Rather, it refers to the fact that the secondary cache 28 is external to the physical memory that implements the primary cache 26. Indeed, in one embodiment the secondary cache 28 is implemented on a daughterboard within the same physical enclosure as the other components of storage server 2 shown in FIG. 2. Alternatively, the secondary cache 28 could be implemented on the motherboard of the storage server 2 or in a separate enclosure from the other components of storage server 2.

The EC layer 36 maintains an insert queue 41 to temporarily store blocks being evicted from the primary cache 26 to the secondary cache 28, prior to writing them to the secondary cache 28. When the insert queue 41 becomes full, the EC layer 36 sends a call to the FAL 37 with the contents of the insert queue 41 to write those contents to the secondary cache 28. The insert queue 41 is then cleared. In one embodiment, the insert queue 41 has a length of 64 data blocks. The EC layer 36 can use a different type of write request for each possible data classification (e.g., slow turn, fast turn, no turn) to indicate to the FAL 37 the classification of data it passes to the FAL 37 for caching.

The EC layer 36 further maintains a set associate cache tag store 40, which stores tags for data stored in the secondary cache 28, to keep track of which data is stored in the secondary cache 28. In one embodiment, each data block is identified by a unique physical volume block number (PVBN), which is known to the EC layer 36. In such an embodiment, the block is looked up in the tag store 40 by hashing the PVBN and a volume ID of the volume which contains the block, to a set within the tag store 40.

The FAL 37 is responsible for mapping a simple data block address space onto the secondary cache 28, while managing cache writes in a way that produces good wear leveling, load balancing and throughput. In particular, the FAL 37 determines where in the secondary cache 28 the individual write units passed down to it from the EC layer 36 get stored, maintains at least one circular FIFO log 42 for controlling cache line eviction/replacement and implements cache line eviction/replacement for the secondary cache 28. A "write unit" in this context is a group of several (e.g., eight) queued data blocks of the same data class (e.g., slow-turn, fast-turn or no-turn) received by the FAL 37 from the EC layer 36. By "circular", what is meant that the replace/evict pointer cycles across the log 42 (i.e., across the memory space of the secondary cache 28) continuously at a rate needed to keep up with the rate of incoming writes to the secondary cache 28. Note that the flash driver layer 38 may virtualize the actual physical locations in flash 28 to the FAL 37. Further details of the operation of the EC layer 36 and FAL 37 are provided below.

The storage operating system 30 can have a distributed architecture. For example, the multiprotocol layer 32 and network access layer 33 can be implemented in an N-module (e.g., N-blade) while the other components of the operating system 30 illustrated in FIG. 3 are implemented in a D-module (e.g., D-blade). In such cases, the N-module and D-module communicate with each other (and, possibly, with other N- and D-modules) through some form of physical interconnect and together form a storage server "node". Such a storage server node can be connected with one or more other storage server nodes to form a highly scalable storage server cluster.

Overall Operation

Operation of the secondary cache 28 and an associated content management and wear leveling methodology will now be described in greater detail. The secondary cache 28 operates in one embodiment as a victim cache to the primary cache (buffer cache) 26. Henceforth in this description, for convenience the terms "secondary cache" and "victim cache" are used interchangeably, and the terms "primary cache" and "buffer cache" are used interchangeably. Note, however, that in other embodiments a secondary cache may not necessarily be employed as a victim cache, and a primary cache may not necessarily be employed as a buffer cache. Further, some embodiments might implement only one level of cache rather than both a primary cache and secondary cache.

Data blocks being ejected from the buffer cache 26 are captured, filtered by various policies, and then placed in the victim cache 28 for later use. For buffer cache lookups, if the buffer cache lookup misses, then the victim cache 28 is consulted before attempting to complete the operation by a RAID input/output (I/O) operation to the main storage subsystem 4. In an embodiment where the main storage subsystem 4 is implemented with HDDs, the victim cache 28 can be employed to reduce demand for scarce HDD random read IOPS. This would allow lower-cost system configurations by employing fewer (and potentially slower) HDDs.

When the storage manager 31 needs to reallocate some buffers from the buffer cache 26 for new uses, it identifies data blocks that can be removed from the buffer cache 26; such blocks are called "victim blocks" or simply "victims". These are clean buffers, meaning that they hold no data that needs to be written to the main storage subsystem 4 prior to buffer reuse. Rather than simply reusing these "victim" buffers, the storage manager 31 instead invokes the EC layer 36 to give it an opportunity to place copies of the blocks cached in these victim buffers into the victim cache 28. If the EC layer 36 determines that a presented victim should be inserted into the victim cache 28, it queues the victim buffer for subsequent writing to the victim cache 28.

When the storage manager 31 fails to find needed blocks in its buffer cache 26, before it requests the RAID layer 34 to read those blocks from the main storage subsystem 4, it invokes the EC layer 36 to see whether those blocks can be retrieved from the victim cache 28. If the cache tags in the cache tag store 40 indicate that one or more requested blocks are in the victim cache 28, a request to read the block(s) from the victim cache 28 is queued, and then control is returned to the storage manager 31, where the requesting message will eventually suspend, awaiting completion of EC-initiated reads and/or RAID-initiated reads (the latter being used if any of the requested blocks were not found in the victim cache 28).

Figure 4:
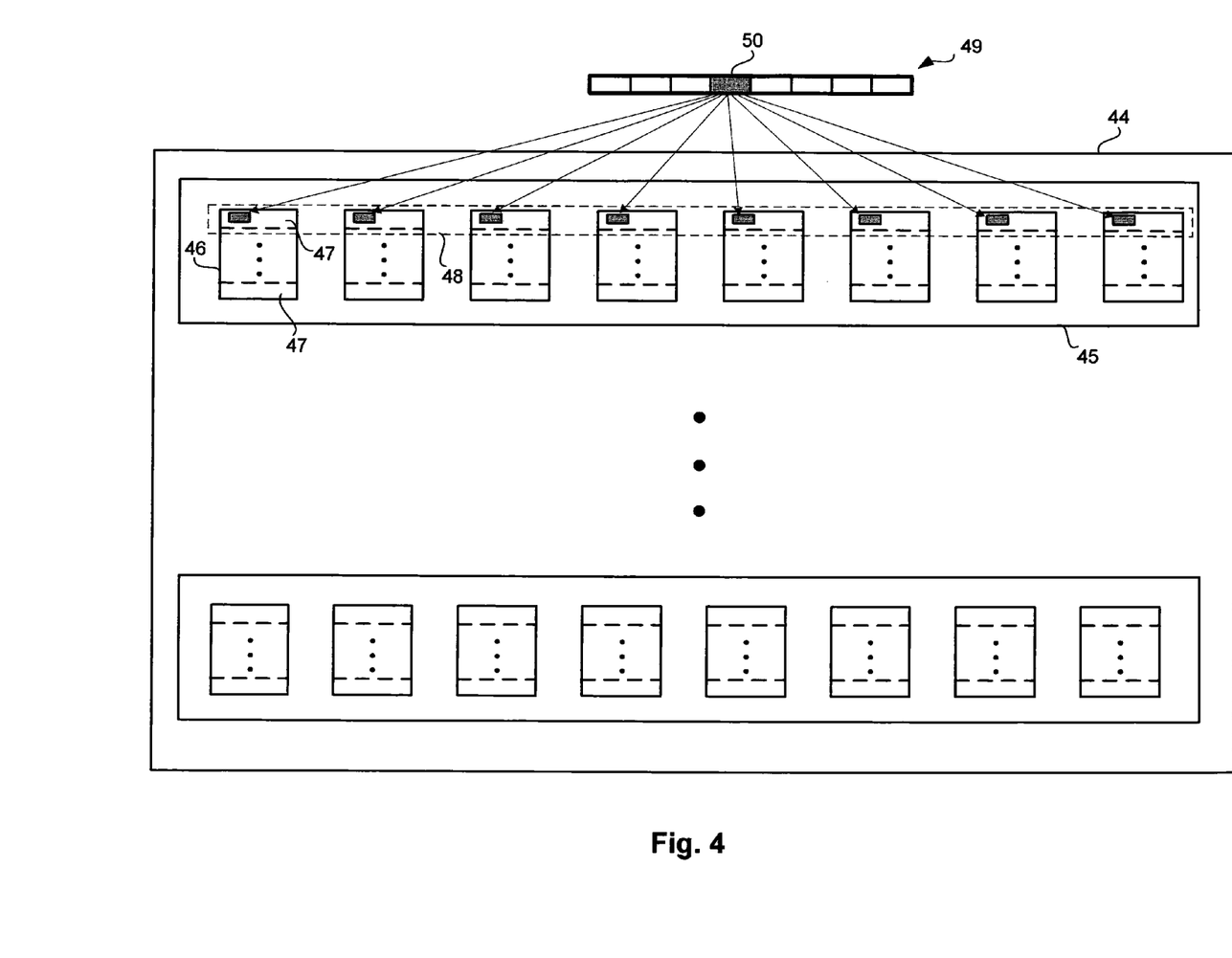
FIG. 4 shows an example of a configuration of the secondary cache and a manner of striping data in an erase stripe.

Referring now to FIG. 4, the victim cache 28 can be implemented on a circuit card 44 as multiple banks 45 of memory chips (e.g., for improved parallelism), where each bank 45 is a row of memory chips. The circuit card 44 has a controller (not shown) on it, which in one embodiment provides multiple 64-bit data interfaces to the storage operating system 30. The controller may be, for example, a field programmable gate array (FPGA), an application-specific integrated circuit (ASIC), or other similar device. One or more of the memory banks 45 can be assigned to each such data interface.

Each memory chip 46 contains multiple erase blocks 47. In one embodiment where the buffer cache 26 includes multiple banks of memory chips, the circular FIFO replacement algorithm and the modifications/exceptions to it described herein are applied separately to each bank in the secondary cache 28, rather than to the secondary cache 28 as a whole.

An "erase stripe" is a group of erase blocks 47, one from each chip 46 in a given bank 45. Hence, each bank 45 contains multiple erase stripes, an example of which is shown as erase stripe 48 in FIG. 4. Note, however, that the erase blocks 47 that make up any given erase stripe do not have to have the same erase block number (relative position within their respective chips 46) as erase stripe 48 does in FIG. 4; an erase stripe can be formed of erase blocks with different block numbers (i.e., in different relative physical positions within their respective chips 46). Therefore, a distinction shall be made here between a physical stripe and a logical stripe. A "logical stripe" is an erase stripe whose physical erase blocks may not all have the same block number. This is in contrast with a physical erase stripe, or physical stripe, whose physical erase blocks all have the same block number. Note that an erase block is not to be confused with a data block. An erase block is a unit of memory space in the secondary cache 28, whereas a data block is a unit of data. An erase block is the smallest unit of memory in secondary cache 28 that can be erased/rewritten at one time, and is typically many times larger than a data block and the smallest programmable unit of memory in the secondary cache 28.

As noted above, the FAL 37 receives data blocks from the EC layer 36 in the form of write units. As illustrated in FIG. 4, a write unit 49 is a group of several queued data blocks 50 of the same data class (e.g., slow-turn, fast-turn or no-turn). In one embodiment, each data block is 4 KB which equals the size of the smallest programmable unit of memory in the secondary cache 28, and each write unit is eight data blocks. In such an embodiment, the FAL 37 stripes each of the eight 4 KB data blocks in a write unit across a logical stripe formed of eight erase blocks on different chips, so that each erase block in the stripe gets 512 bytes from each of the eight data blocks. In one embodiment a 64 byte checksum/context entry is stored with each 4 KB data block, and this entry is also distributed across the stripe, so that 520 bytes are written to each erase block in the stripe.

Note that a cache used in conjunction with the technique being introduced here can be configured differently from the configuration represented in FIG. 4. For example, such a cache can include multiple devices, such as multiple PCI cards or SSDs. Also, such a cache can be tiered with each tier including storage devices of a different type; for example, a tiered cache might include single-level cell (SLC) NAND flash tier and multi-level cell (MLC) NAND flash tier within a single hierarchy. Further, such a cache can be a tier within a hybrid aggregate (a group of physical storage devices with non-identical physical and/or operational characteristics) that includes multiple tiers, at least some of which might not be managed as a cache. For example, the cache can be one or more upper tiers within an automatically tiered storage system, in which the write allocation techniques described herein are employed.

Figure 6:
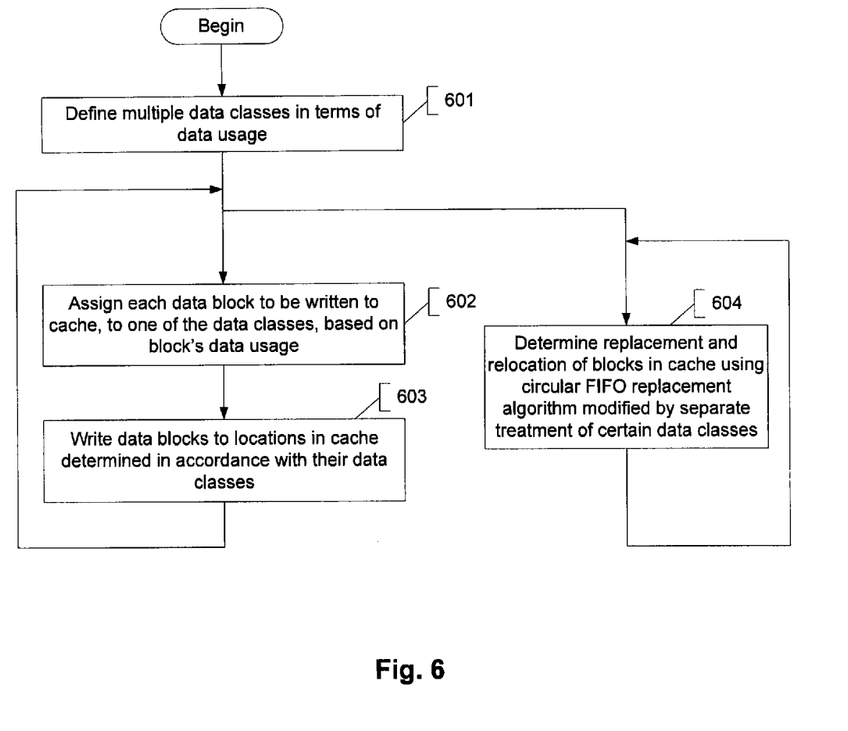
FIG. 6 is a flowchart illustrating an example of an overall process of cache management in accordance with a technique introduced here.

FIG. 6 illustrates an example of an overall process of cache management, in accordance with a technique introduced here. Initially, at 601 multiple data classes are defined in terms of data usage. As described above, those classes can include slow-turn data, fast-turn data and no-turn data. In other embodiments, additional and/or different data classes may be defined. Operation 601 may be performed prior to the normal runtime of the storage server 2, such as during design time or during boot-up/initialization of the storage server 2. Subsequently, during normal operation of the storage server 2, at 602 each data block that is to be written to a cache is assigned to one of those data classes (where the cache may be the secondary cache 28, for example, and where the block is being evicted from the buffer cache 26) based, for example, on its data usage (e.g., usage history or workload). In one embodiment, a data block is classified in this manner just before it is written to the cache. At 603, data blocks are written to that cache, when appropriate (upon eviction from the primary cache 26, for example), in locations that are determined in accordance with their data classes, as described above and as further described below. Concurrently with operations 602 and 603, the storage server 2 determines which data blocks should be replaced within the cache by using the circular FIFO replacement algorithm, subject to modification by the defined different manner of treating certain data classes. For example, fast-turn data may be replaced in the cache earlier than would be called for by the circular FIFO replacement algorithm; on the other hand, no-turn data may be exempted from the circular FIFO replacement algorithm for one or more cycles of that algorithm; etc. It will be recognized by those of ordinary skill in the art that operation 603 may also be performed in currently with 602.

Detailed Operation

External Cache (EC) Layer

The EC layer 36 maintains, in the cache tag store 40, a cache tag for each block stored in the victim cache 28. In one embodiment, new blocks are written to locations in the victim cache 28 selected by the FAL 37 to provide improved performance and wear leveling. For cache capacity purposes, the ideal tag organization might be fully associative and permit any combination of blocks to occupy the cache. However, the lookup into a fully associative cache would not be very efficient. Therefore, in one embodiment a set associative tag store is used.

The FAL 37 hides the details of flash memory management from the EC layer 36. The FAL 37 exposes to the EC layer 36 a single address space for the victim cache 28. The FAL interacts 37 with the EC layer 36 through several command interfaces. In one embodiment, these interfaces are: Start_Write_to_Cache, Start_Read_from_Cache, Release_Fast-turn_Stripe, Get_Bank_Generation_Number, Get_Time_to_Overwrite, Get_Bank_Sizes and I/O_Completion.

Start_Write_to_Cache is used by the EC layer 36 to pass a list of data blocks (buffers) to the FAL 37 for writing into the cache. In one embodiment this is an asynchronous interface; if the requested blocks cannot be scheduled for writing immediately due to an available resource limitation, they are queued at the point of resource blockage (either in the FAL 37 or the flash driver 38), and control is returned to the EC layer 37.

The FAL 37 chooses the actual location of blocks newly written to the victim cache 28 and tells the EC layer 36 the bank identifier (ID), bank block number, and bank generation number for the insertion. The EC layer 36 uses the generation number to identify cache entries which have been invalidated by FAL overwrites without having to support reverse lookups in the tag store 40.

The EC layer 36 designates whether blocks written to the victim cache 28 are entered as fast-turn, slow-turn or no-turn entries. As noted above, the specific criteria used by the EC layer 36 to classify data into these categories can be set by policy and can be implementation specific. A fast-turn entry is considered likely to be invalidated (e.g. by an overwrite) within a fraction of a cache replacement queue (circular log) cycle. The FAL 37 packs fast-turn entries and Slow-turn entries into different erase stripes, to allow fast-turn erase stripes released by the EC layer 36 to be rewritten and refilled with Slow-turn entries long before those stripes would be reused by the normal circular log write pattern.

Start_Read_from_Cache is used by the EC layer 36 to enqueue read requests for a set of blocks which hit in the tag store 40. The FAL 37 validates the request, maps it to physical flash locations, and passes it to the flash driver 38.

Release_Fast-turn_Stripe is used by the EC layer 36 to free an erase stripe so that the erase stripe can be refilled with Slow-turn data to maintain high capacity utilization as discussed above.

Get_Bank_Generation_Number is used by the EC layer 36 to confirm the validity of blocks in the tag store 40. All blocks stored in a flash bank at any given moment have one of a limited number of bank generation numbers, which get recycled. For example, in one embodiment two bits per bank are allocated for generation numbers, allowing for four unique generation numbers per bank.

Get_Time_to_Overwrite: is used by the EC layer 36 to determine, for a given bank ID and block number, what percentage of the bank is yet to be written before the specified block is overwritten. The EC layer 36 can use this information to determine whether to reinstall a block in the victim cache 28 (because it will soon expire).

Get_Bank_Sizes is used by the EC layer 36 to determine the maximum bank block number and erase block stripe size for each bank of memory in the victim cache. The EC layer 36 can use these values to implement a count of valid entries in an erase stripe by bank block number to inform fast-turn releases.

I/O_Completion signals, to the EC layer 36, completion of a read from or write to the victim cache 28.

Figure 5:
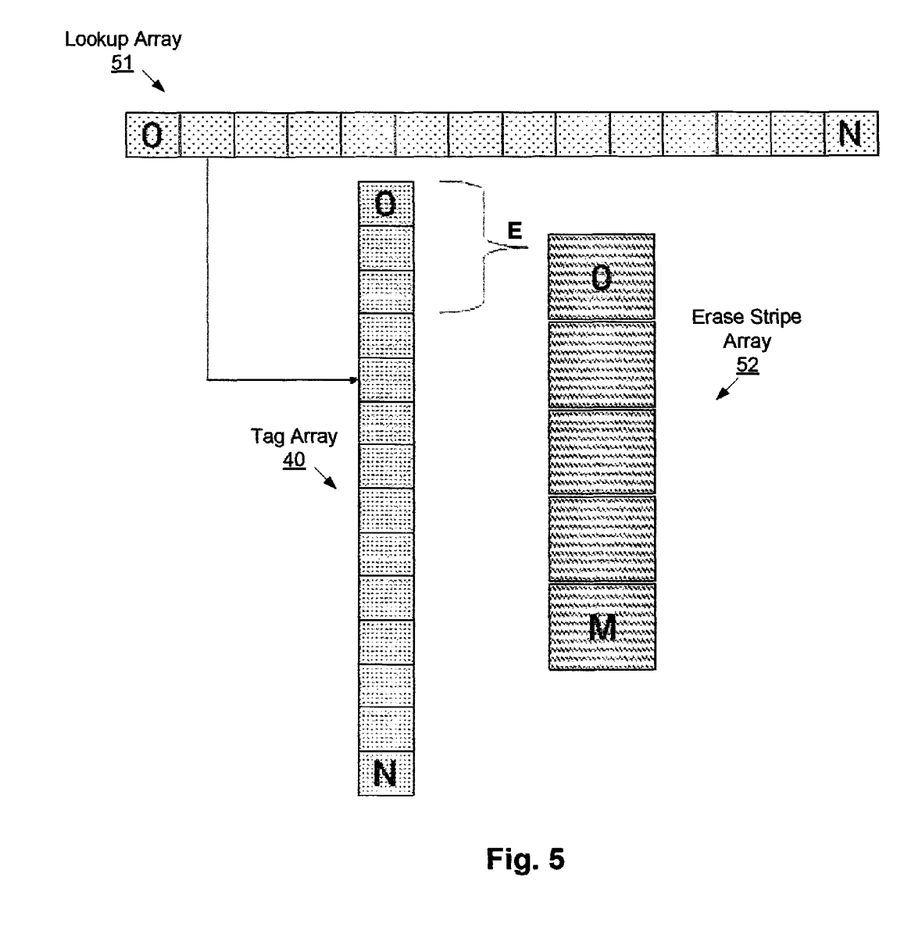
FIG. 5 shows data structures used to manage the contents of a victim cache of a storage server.

Referring now to FIG. 5, in one embodiment the EC layer 36 tracks data blocks stored in the secondary cache 28 by using three separate arrays: a lookup array 51, a tag array (the tag store) 40 and an erase stripe array 52. In one embodiment, the lookup array 51 is set associative and entries in the lookup array 51 are accessed via hashing the EC layer's data key, the PVBN, to a set. The lookup array 51 can contain N entries, for example, one entry for each data block in the secondary cache 28. Each entry in the lookup array 51 references (is an index to) a separate entry in the tag array 40. In another embodiment, the lookup array 51 can be oversized to reduce the number of collisions in the set associative hashing. For example, the lookup array 51 may have 2N entries for N data blocks.

Entries in the tag array 40 represent individual file system data blocks stored in the secondary cache 28. The tag array 40 contains N entries, one entry for each data block in the secondary cache 28. Each entry in the tag array 40 can contain the actual cache tag (PVBN, volume index) of the corresponding cached block, a count of references to the block, and various state information relating to the block (e.g., a context hint, the FAL generation number, an indication of whether the block is currently being read or written). The entries in the tag array 40 are in logical block address order: the first tag represents physical block 0 in the secondary cache 28, the second tag represents physical block 1, and so forth.

Entries in the erase stripe array 52 represent individual erase stripes in the secondary cache 28; erase stripe entry 0 is the first erase stripe in the secondary cache 28, etc. The erase stripe array 52 and contains M entries, one for each erase stripe in the secondary cache 28. Each entry in the erase stripe array 52 maps to E consecutive entries in the tag array 40, where E is the number of data blocks in an erase stripe of the secondary cache 28. Each erase stripe entry contains state information for the erase stripe (e.g., stripe type, written blocks, invalidated blocks, current generation number if the stripe is active, reason for invalidation if the stripe has been invalidated, number of currently active entries in the stripe, etc.). Each erase stripe entry is used to track how much usage the corresponding erase stripe has and to detect situations where the FAL 37 should be informed that a stripe can be reused (and potentially should relocate its data).

In one embodiment, the entries in the tag array 40 are arranged in erase stripe order. Assuming an embodiment in which each erase stripe contains 512 data blocks, the first 512 entries in the tag array correspond to the first erase stripe, the second 512 entries correspond to the second erase stripe, etc.

This array architecture allows fast random access of tags via hashed keys (e.g., PVBNs) and also mapping of erase stripes to tags without requiring additional pointers or memory. Thus, when an erase stripe is overwritten (e.g., as part of the circular log cycle) or fails, the tags associated with the erase stripe can be identified and cleaned from the arrays easily. Being able to access tags by either random keyed access or indexed via erase stripe, without a corresponding penalty in space, is advantageous in maintaining the cache tags.

To support this architecture, the FAL 37 maintains a consistent set of logical block addresses across multiple flash banks and potentially even multiple flash cards. The array design separates the PVBN lookup requirement (i.e., hash (PVBN, volume ID)→tag store entry) from the physical representation of tag state, by splitting the tag information into two arrays. It also supports relatively efficient mapping between erase stripes and the tag entries associated with those tags.

When a block is inserted into the secondary cache 28, its PVBN is hashed to an entry in the lookup array 51. When the write completes, the FAL 37 returns a block index value to the EC layer 36. The block index value is a mapping of {card, interface, bank, stripe index, page} to a linear layout of blocks in the secondary cache 28. The tag store data is then placed in tag array 40 at a location indexed by the block index value. The location of the block in the secondary cache 28 is thus derived from its location in the tag array 40.

Because the location of the entry in the tag array 40 (and hence the tag index to use) is not known until the insert operation completes, a mechanism is employed to preserve the tag information until the insert operation completes. This can be accomplished by allocating additional tags, i.e., "dummy tags", in the tag array 40 and storing the pending I/O data in those entries. When the insert operation completes, the data is copied from the dummy tags to the real tags.

Flash Adaptation Layer (FAL)

The FAL 37 determines where in the secondary cache 28 individual write units passed down to it from the EC layer 36 get stored (e.g., based on their data classes), maintains the circular FIFO log 42 for controlling cache line eviction/replacement and implements cache line eviction/replacement for the secondary cache 28. In one embodiment, when the circular FIFO log 42 is full, additional writes to the secondary cache 28 erase existing cache entries at the granularity of an erase stripe. Writes can be placed by the FAL 37 in a round-robin manner across all available flash banks, first alternating across cards, then across interfaces, and then across banks within an interface. This approach increases parallelism and reduces resource conflicts.

In one embodiment, to perform write placement the FAL 37 maintains three active logical stripes for each online bank of memory in the secondary cache 28. Of the three active logical stripes for each bank, one is the current active logical stripe for slow-turn data, another is the active logical stripe for fast-turn data, and a third is the active logical stripe for no-turn data. For each active logical stripe, the FAL 37 maintains a current bank page index and an overall current bank pointer. A "bank page" is a stripe of pages across a bank of memory in the secondary cache 28. A "page" is the minimum unit of programming in the secondary memory 28, which may be for example a 4 KB unit. A bank page may be, for example, a write unit to the FAL 37, which as noted above can be a chain of eight data blocks.

When the FAL 37 receives a write request from the EC layer 36, it iterates through the write request (the write interface is described above). Each write unit in the write request is placed in the current bank page of the appropriate logical stripe (fast-turn or Slow-turn, depending on whether the write unit contains fast or Slow-turn data) of the current bank. Then the FAL 37 increments the current page index and changes the current bank pointer to the next online bank (according to the order mentioned above). If the page index reaches the end of the logical stripe, another logical stripe is allocated out of the list of free logical stripes (which is also maintained per bank) and made active.

In one embodiment, to carry out a write to the secondary cache 28, the FAL 37 splits each write unit (e.g., eight data blocks) received in the write request from the EC layer 36 into a separate FAL write request. Then the FAL 37 places each write unit into a different logical erase stripe, i.e., write units are alternated across banks.

Wear leveling across the secondary cache 28 can be achieved by the FAL 37 by using a circular log 42, as discussed above. In one embodiment, a separate circular log 42 is maintained for each memory bank of the secondary cache 28, to ensure even wear across the blocks in a bank (exceptions are the handling of no-turn data and fast-turn data, as discussed further below). Round-robin scheduling of writes across banks approximately evens the wear on different banks, as long as they are approximately the same size. By circular, what is meant is that the FIFO-driven erase point moves across the bank in a cyclic fashion at a rate needed to keep up with the rate of incoming writes.

A data block written by the EC layer 36 is placed by the FAL 37 into a freshly erased logical stripe, which means that normally the data block will not be invalidated by the FAL 37 until the erase point goes around the bank and comes back to the same logical stripe. When a logical stripe is erased, all of the data blocks in that stripe become invalid. This happens regardless of how "hot" or "cold" the contents of a block are in the logical stripe being erased.

If the EC layer 36 wants to prevent a hot data block from being erased in the secondary cache 28, the cache line rewrite mechanism mentioned above is available for that purpose. There are at least three possible scenarios in which this can be done. First, when a stripe is selected for replacement/erase in the secondary cache 28, the EC layer 36 can check whether it is hot and, if it is, copy the hot blocks out of it at that time. Second, when a data block is read from the secondary cache 28, the EC layer 36 can determine whether it is subject to being overwritten soon (e.g., by using the Get_Time_to_Overwrite interface) and, if it is, the EC layer 36 may write the data block to a new location in the secondary cache 28.

Third, when a data block is being evicted from the primary cache 26, normally it would only be written to the secondary cache 28 if it is not already present there. However, as an alternative, the EC layer 36 can use the Get_Time_to_Overwrite interface to determine how far a data block is from being erased and (as in the second scenario) write the block to a new location in secondary cache 28 if it is within the specified threshold of being erased.

Yet another mechanism to prevent hot blocks from being erased is the no-turn data class. The FAL 37 places all data marked as no-turn data into designated no-turn logical stripes in the secondary cache 28. No-turn logical stripes will not be erased by the normal cycling of the circular log 42, although at some point they will eventually be erased. For example, no-turn logical stripes may be exempted from the normal cache replacement cycle for some predetermined number of cycles of the circular log 42, after which time they are replaced normally. Further, a no-turn erase stripe's exemption from the normal replacement cycle may be canceled if a sufficient (e.g. policy-determined) fraction of the data blocks in that logical stripe have been invalidated by logical overwrites or deletions.

The invalidation of data blocks in a logical stripe being erased happens by use of a generation count mechanism. When a block is erased, its generation count is incremented. The FAL 37 maintains one generation count per bank in the secondary cache 28. The FAL 37 provides the EC layer 36 with an interface to determine if a particular data block is valid, as mentioned above. The FAL 37 can implement this interface as follows: If the block location is behind the current erase point and the generation count matches, the block location is considered valid. The block location is also considered valid if the location is ahead of the current erase point and the generation count is one less than the current generation count.

An exception to the use of the circular log 42 to determine cache eviction/replacement is fast-turn data. Data blocks marked as fast-turn data are grouped into logical stripes designated to hold only fast-turn data. As mentioned above, in one embodiment there is one active fast-turn logical stripe maintained per bank. When the active fast-turn logical stripe fills up, the FAL 37 picks the next available logical stripe as the next fast-turn logical stripe. As a result, a logical stripe is selected to be a fast-turn logical stripe essentially at random. It is the responsibility of the EC layer 36 to invalidate a fast-turn logical stripe when appropriate. When the EC layer 36 invalidates a fast-turn logical stripe, the FAL 37 erases it and recycles it for use as slow-turn data. This provides nearly uniform wear after a large number of circular log cycles.

Figure 7:
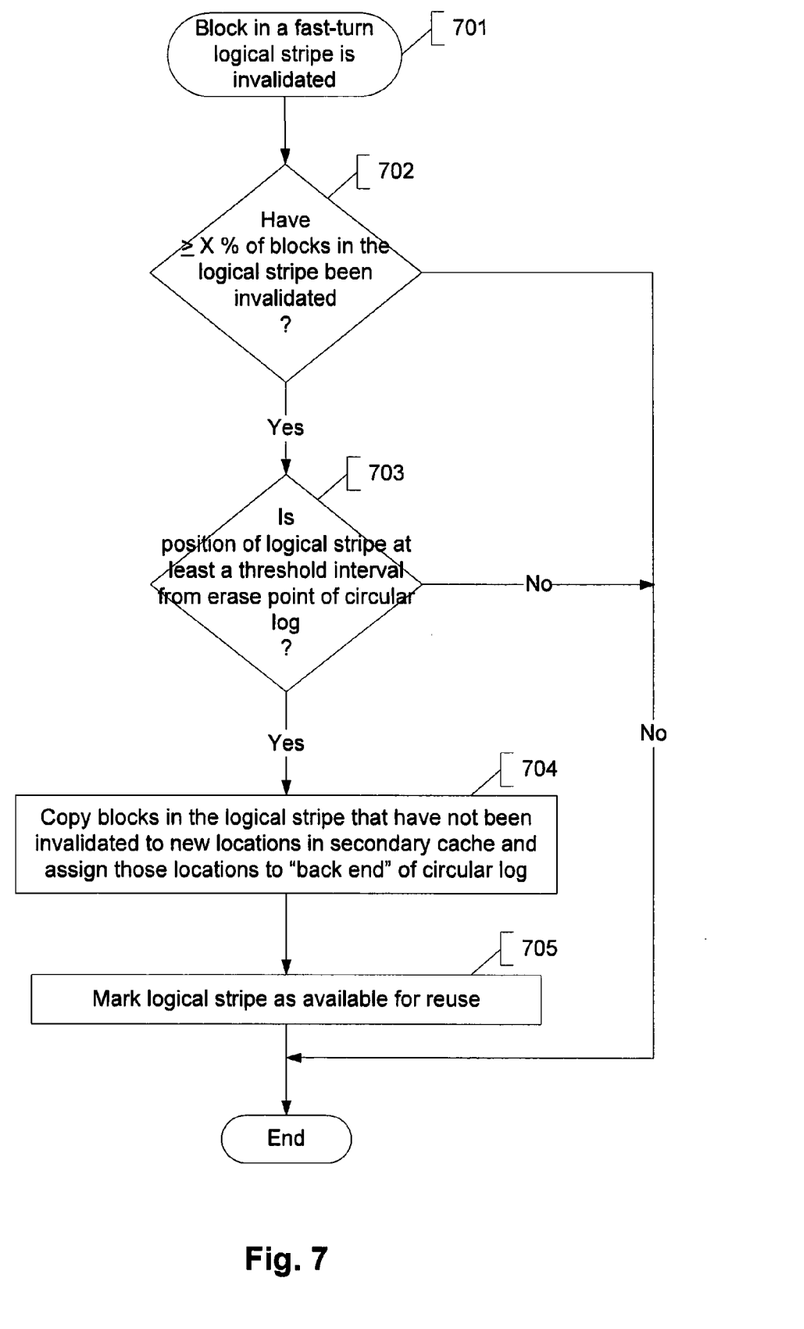
FIG. 7 is a flowchart illustrating an example of a process of managing a fast-turn data stripe in a cache.

As noted above, in some instances all of the data blocks in a fast-turn logical stripe are made available for reuse even before they would be according to the normal FIFO replacement algorithm, for example when a sufficient number of those blocks have been invalidated and a sufficient number of those blocks are sufficiently close to being replaced according to the normal FIFO replacement algorithm. This process is illustrated in FIG. 7.

The process may be triggered, for example, each time a data block stored in a fast-turn logical stripe is invalidated (701). In response to a block being invalidated, the process determines at 702 whether at least some predetermined percentage X of the data blocks in that logical stripe have been invalidated. In one embodiment (illustrated), if at least X% of the data blocks in that stripe have been invalidated, then the process determines at 703 whether the position/location of the logical stripe is at least a threshold (e.g., policy-specified) interval from FIFO-driven replacement ("the erase point") of the corresponding circular log. In another embodiment, check 703 may be omitted, such as in an embodiment where the determination of whether a logical stripe should be reused is based primarily or entirely on how many invalid blocks the logical stripe contains. Checks 702 and 703 can be executed by the EC layer 36, for example. The FAL 37 can also perform these checks 702 and 703, for example, in response to the EC layer 36 informing it that an erase stripe can be reused.

In one embodiment, if the outcome of 703 is also affirmative, then the process proceeds to 704, in which all of the data blocks in that logical stripe which have not been invalidated are copied to new locations in the secondary cache 28, and those locations are assigned to the back end of the circular log. In another embodiment, operation 704 acts upon only those blocks in the logical stripe that are deemed to be hot. In yet another embodiment, operation 704 is omitted entirely, i.e., none of the data in the logical stripe are relocated.

Finally, the entire logical stripe is then marked as available for reuse at 705. In general, the logical stripe would be reused for slow turn data, to provide more even wear across logical stripes.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, special-purpose hardwired circuitry, software and/or firmware in conjunction with programmable circuitry, or a combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:
1. A method comprising:
  in a storage system that includes a cache implemented in non-volatile solid-state storage, classifying data to be stored in the cache into a plurality of data classes, based on expected usage of the data;
  making write allocation decisions for the cache by executing a cache replacement process that concurrently applies cache hit optimization and wear optimization for the cache, wherein making the write allocation decisions includes
   assigning each of a plurality of regions of the non-volatile solid-state storage to store data of a different data class of the plurality of data classes, such that each region of the plurality of regions is assigned to store data of only one data class of the plurality of classes;
   determining, individually for each of the plurality of regions of the non-volatile solid-state storage, whether to apply a circular first-in first-out (FIFO) replacement algorithm or an exception to the circular FIFO replacement algorithm to data stored in said region;
   defining a first data class, of the plurality of data classes, to include data which are expected to remain valid in the cache for at least a complete cycle of a circular FIFO cache replacement log and that is replaced in the cache upon expiration of a complete cycle of the cache replacement log in an event that the data are determined not to be recently used, wherein data in the cache is invalidated when it is logically overwritten or deleted;
   defining a second data class, of the plurality of data classes, to include data which are expected to remain valid in the cache for less than a complete cycle of the cache replacement log; and
   writing to locations in the cache according to the write allocation decisions.

2. A method as recited in claim 1, wherein each of the regions is an erase block of the non-volatile solid-state storage.

3. A method as recited in claim 1, wherein making the write allocation decisions comprises selecting locations in the cache so that, for each of the plurality of data classes, the data in said data class tend to be grouped together in the cache.

4. A method as recited in claim 3, wherein making write allocation decisions for the cache further comprises defining a third data class, of the plurality of data classes, to include data which are expected to remain valid in the cache for a plurality of complete cycles of the cache replacement log.

5. A method as recited in claim 3, wherein each of the regions is an erase bock of the non-volatile solid-state storage.

6. A method as recited in claim 5, wherein making write allocation decisions comprises ensuring that at least some of the data in each of the data classes are confined to a specified set of one or more erase blocks of the non-volatile solid-state storage.

7. A method as recited in claim 6, wherein the specified set of one or more erase blocks comprises an integer number of erase block stripes, each said erase block stripe including a set of erase blocks distributed across a plurality of physical memory devices.

8. A method as recited in claim 7, wherein each said erase block stripe is a RAID parity group.

9. A method as recited in claim 1, wherein making write allocation decisions for the cache further comprises:
   detecting when a predetermined amount of data, stored in a region of the cache that contains data of the second data class, have been invalidated; and
   responsive at least in part to said detecting, making the region available for reuse before a location in the region reaches FIFO-driven replacement.

10. A method as recited in claim 9, further comprising:
   copying at least some data units in the region which have not been invalidated to new locations in the cache, prior to making the region available for reuse; and
   assigning the copied data units to a tail end of the cache replacement log.

11. A method as recited in claim 9, wherein making the region available for reuse comprises making the region available for reuse only for data of a class other than the second data class.

12. A method as recited in claim 1, wherein making write allocation decisions for the cache further comprises:
   identifying a plurality of data in the cache as being subject to imminent replacement in the cache and as having been recently used; and
   copying the identified data to new locations in the cache and assigning the identified data to a tail end of the cache replacement log.

13. A method comprising:
   receiving at a storage server a plurality of data access requests from a plurality of storage clients over a network, the storage server including a primary cache and a secondary cache, the secondary cache implemented as non-volatile solid-state storage including a plurality of erase blocks;
   defining a first data class in the storage server to include data which are expected to remain valid in the secondary cache for at least a complete cycle of a circular cache replacement log and that should be replaced in the secondary cache in an event that the data are determined to be not recently used;
   defining a second data class in the storage server to include data in the secondary cache which are expected to remain valid for less than a complete cycle of the cache replacement log;
   defining a third data class in the storage server to include data in the secondary cache which are expected to remain valid for a plurality of complete cycles of the cache replacement log;
   classifying each of a plurality of data units in the storage server into one of the first, second or third data class, based on a usage frequency of each said data unit; and
   making write allocation decisions for the plurality of data units with respect to the secondary cache, by selecting locations in the secondary cache so that data from each of the first, second or third data class are confined at any given time to a separate set of one or more erase block stripes, each said erase block stripe including a set of erase blocks distributed across a plurality of physical memory devices.

14. A method as recited in claim 13, wherein each said erase block stripe is a RAID parity group.

15. A method as recited in claim 13, wherein the non-volatile solid-state storage comprises a plurality of erase blocks, and wherein selecting locations in the secondary cache comprises selecting locations in the secondary cache so that each of the plurality of erase blocks will store data from only one of the first, second or third data class at a time.

16. A method as recited in claim 15, wherein making write allocation decisions comprises:
   detecting that a predetermined amount of data, stored in a region of the cache that contains data of the second data class, have been invalidated; and
   responsive at least in part to said detecting, immediately making locations in the region that have been invalidated available for reuse.

17. A method as recited in claim 15, wherein making write allocation decisions further comprises:
   identifying a plurality of data in the secondary cache as being subject to imminent replacement in the secondary cache and as having been recently used; and copying the identified data to new locations in the cache and assigning the identified data to a tail end of the cache replacement log.

18. A method as recited in claim 13, wherein data in the secondary cache is invalid when it is logically overwritten or deleted.

* * * * *

UNITED STATES PATENT AND TRADEMARK OFFICE
CERTIFICATE OF CORRECTION

PATENT NO. : 8,621,145 B1
APPLICATION NO. : 12/697129
DATED : December 31, 2013
INVENTOR(S) : Jeffrey S. Kimmel et al.

Page 1 of 1

It is certified that error appears in the above-identified patent and that said Letters Patent is hereby corrected as shown below:

On the Title page, in item (56), in column 1, under "U.S. Patent Documents", line 13, delete "2008/0216800 A1 9/2008 Brusoe et al." and insert -- 2008/0215800 A1 9/2008 Lee et al. --, therefor.

On the Title page, in item (56), in column 2, under "Other Publications", line 14, delete "Lastest" and insert -- Latest --, therefor.

On the Title page, in item (56), in column 2, under "Other Publications", line 17, delete "Distrubted" and insert -- Distributed --, therefor.

Signed and Sealed this
Twenty-ninth Day of July, 2014

Michelle K. Lee
*Deputy Director of the United States Patent and Trademark Office*